United States Patent [19]

Francioni

[11] Patent Number: 5,220,995
[45] Date of Patent: Jun. 22, 1993

[54] DEVICE FOR DIVERTING A MOVING FLOW OF PRODUCTS, PARTICULARLY FOR PACKAGING MACHINES

[75] Inventor: Renzo Francioni, Prato Sesia, Italy

[73] Assignee: Cavanna S.p.A., Prato Sesia, Italy

[21] Appl. No.: 901,215

[22] Filed: Jun. 19, 1992

[30] Foreign Application Priority Data

Jun. 20, 1991 [IT] Italy .................. T091 A 000469

[51] Int. Cl.⁵ .................................. B65G 47/26
[52] U.S. Cl. ........................................ 198/457
[58] Field of Search ................................ 198/457

[56] References Cited

U.S. PATENT DOCUMENTS

| | | | |
|---|---|---|---|
| 3,799,319 | 3/1974 | Cutler et al. ............... | 198/457 X |
| 4,193,491 | 3/1980 | James et al. ............... | 198/457 X |
| 4,219,112 | 8/1980 | Loewenthal ............... | 198/457 X |
| 4,742,921 | 5/1988 | Staley, 3rd ............... | 198/457 X |
| 5,141,216 | 8/1992 | Ballestrazzi et al. ....... | 198/457 X |

FOREIGN PATENT DOCUMENTS

| | | |
|---|---|---|
| 0366857 | 5/1990 | European Pat. Off. |
| 2214656 | 11/1972 | Fed. Rep. of Germany ...... 198/457 |
| 3811022 | 10/1989 | Fed. Rep. of Germany . |
| 2025345 | 1/1980 | United Kingdom . |
| 2197283 | 5/1988 | United Kingdom . |

Primary Examiner—D. Glenn Dayoan
Attorney, Agent, or Firm—Evenson, McKeown, Edwards & Lenahan

[57] ABSTRACT

In a device for diverting a moving flow of products, the products advance on a flexible belt conveyor which turns downwardly in the region where it converges with a second conveyor line so as to form an output edge which is aligned substantially in the direction in which the flow of products is to be diverted. A receiving element on the side opposite the belt conveyor is constituted, for example, by a disc which is almost in contact with the output edge. The disc moves at an angular velocity such that its outer edge, which is substantially coplanar with the transportation plane of the flexible belt conveyor, moves substantially in synchronism with the products. The preferred application of the device is to automatic packaging devices.

16 Claims, 4 Drawing Sheets

DEVICE FOR DIVERTING A MOVING FLOW OF PRODUCTS, PARTICULARLY FOR PACKAGING MACHINES

BACKGROUND AND SUMMARY OF THE INVENTION

In general, the present invention addresses the problem of diverting a moving flow of products. It has been developed with particular attention to its possible use in the field of automatic packaging plants (automatic packaging machines).

In this field of application (but also in other situations of use) the need arises to be able to divert a flow of products which are advancing continuously or substantially continuously in a certain initial direction so that the flow of products in question moves in a final direction which is inclined at a generally acute angle to the initial direction, that is—according to the meaning to be attributed to this term in the present description and, where necessary, in the following claims—at an angle of less than 30°.

This need is experienced in particular in any situation in which two flows of products or articles are to be made to converge in a generally "Y"-shaped arrangement.

It arises, for example, in situations in which the two input branches of the "Y"-shaped convergence are represented respectively by a flow of products to be packed and a flow of accessory elements, for example cards, to be inserted beneath one or more products so as to form the base of a package. The output branch of the "Y" is thus constituted by a flow of articles, possibly in groups, disposed on respective cards; this output flow can thus be sent, for example, towards a wrapping machine for forming wrappers of the type currently known as "flow-packs" or "form-fill-seal" wrappers or simply FFSs, so as to produce finished packages, each of which contains one or more articles disposed on a base card and wrapped in a tubular wrapper of sheet material closed at its ends by sealing flanges (or flaps). In this field of application, the cards can be supplied by a conveyor line (for example, a chain conveyor with entrainment teeth or nibs) which defines or is aligned with the supply line to the wrapping machine. The flow of articles to be placed on the cards therefore converges with the main entrainment line from one side at a generally acute angle so that the flow of products has to be diverted angularly as the products are loaded onto the base cards.

In the field referred to by way of example (it should be noted, however, that the same problems may also arise in a practically identical manner in quite different situations of use) in order to achieve a completely satisfactory angular diversion of the flow it is necessary to take account of various factors, such as:

the growing tendency to use ever-faster operating rates in automatic packaging plants—and hence ever-faster linear velocities of movement of the products processed—which means that even quite light products acquire considerable momentum and thus exhibit a certain inertia in relation to any operations to divert the direction of the flow;

the need to avoid discontinuities in the surfaces which support the products between conveyor elements disposed in cascade, particularly for small products which themselves exhibit fairly unstable equilibrium (for example, pralines in respective pleated paper cases) since discontinuities may cause the products to fall over or even roll along the conveyor lines;

the need to conserve precise relative positioning between successive products even after the flow has been diverted; the diversion of the flow is in fact often carried out on products which are already "synchronised", that is to say, already located in precise temporal and spatial relationships relative to the elements which have to receive and process them in the stations of the plant further downstream, and the fact that the products processed may themselves be very delicate (for example, very soft or doughy confectionery products) so that too firm a handling operation may give rise to damage to the product which is disadvantageous both as regards the possible alteration of the product, and as regards the risk that parts of the product may be detached therefrom and fall onto the conveyor line, resulting in jamming.

Naturally, in some particular situations of use, the list of problems outlined above may not be exhaustive.

The main object of the present invention is to provide means for diverting a moving flow of products without giving rise to the problems cited above.

This and other objects and advantages are achieved by the flow diversion device according to the invention, in which a stream of products is conveyed in an initial direction to a point of diversion, by a flexible conveyor belt having a discharge edge formed by a roller, or a so-called feather edge, which is substantially parallel to a final direction of advance. A receiving element in the form of a circular disc, which is coplanar with the conveyor belt and has its periphery substantially tangential to the discharge edge, receives the products and transfers them to a second conveyor which is aligned in the final direction of advance.

Other objects, advantages and novel features of the present invention will become apparent from the following detailed description of the invention when considered in conjunction with the accompanying drawings.

DETAILED DESCRIPTION OF THE DRAWINGS

The appended, drawings relate specifically to one branch of an automatic wrapping machine of which all the parts (the framework, the support structure, the drive motors, etc.) which are not essential for the purposes of an understanding of the invention have been omitted for clarity of representation; these elements are in any case formed according to criteria widely known in the art.

Figure 1:
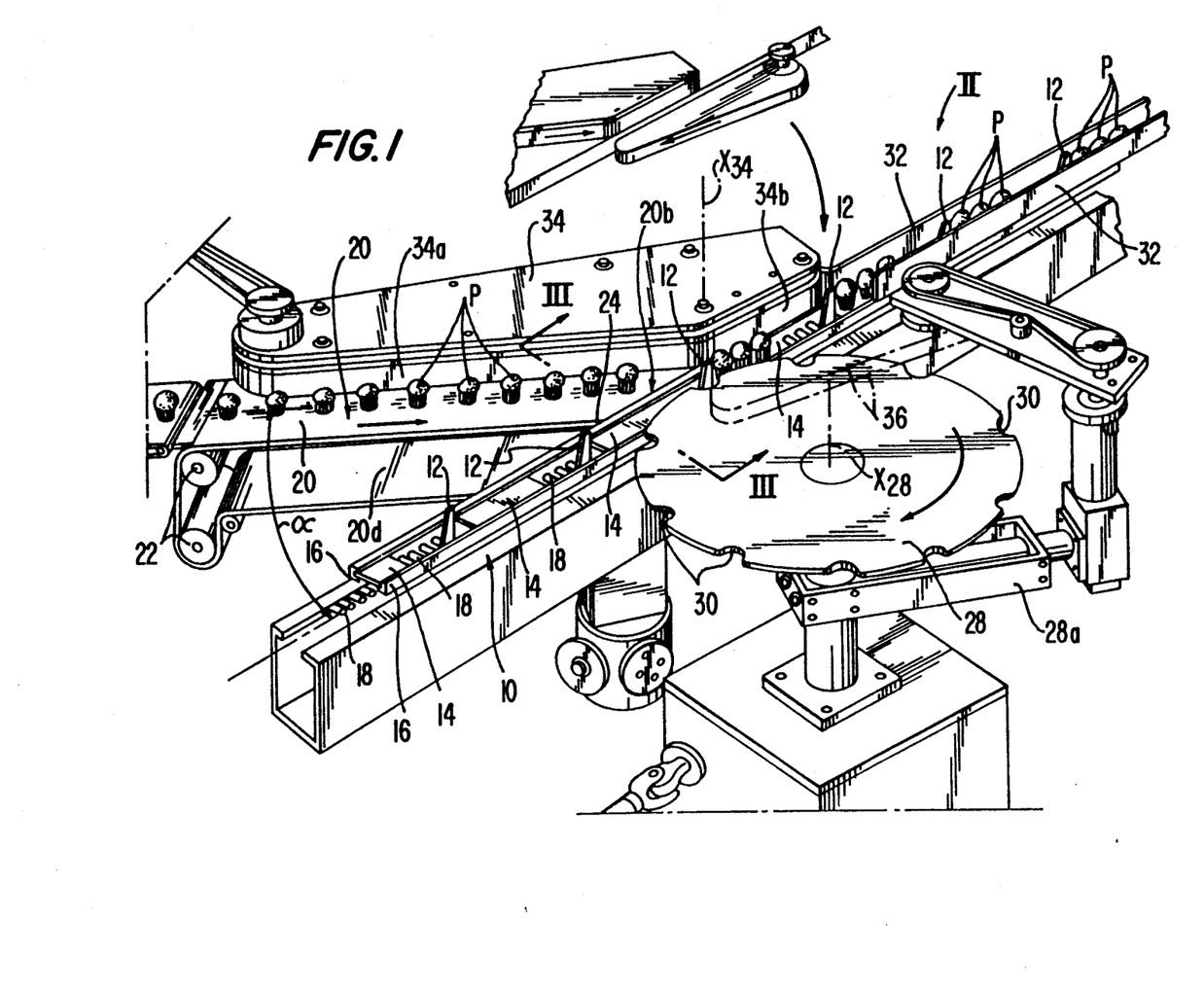
FIG. 1 is a first perspective view of a device for diverting a flow of products according to the invention.

In FIG. 1, a chain conveyor line, indicated 10, has a plurality of teeth or nibs 12 for advancing a flow of cards 14 horizontally (generally from left to right with reference to the observation point of FIG. 1) from an upstream supply or loading station (not shown in the drawings) towards a wrapping machine (for example, an FFS wrapping machine which is also not shown in the drawings).

In the supply station, the cards 14 are slid between two C-shaped lateral cheeks 16 which open towards each other and are spaced apart so that the upper, active pass 18 of the chain conveyor line 10 can pass freely between them.

Products P constituted, for example, by pralines in respective pleated paper cases are to be arranged on the cards 14 for subsequent supply to the wrapping machine.

In the particular embodiment illustrated, three products P are to be placed on each card 14.

This is achieved, in known manner, by the coordinated control both of the distance between the products P on the belt 20 which causes them to converge with the conveyor line 10 in a Y-shaped configuration, and of the distance between the successive nibs 12 of the latter line. In practice, the distance between the nibs 12 is determined in dependence on the number of products P to be grouped in each package and the distance between the products P on the belt 20 is regulated so that, when they converge with the line 10, each nib 12 of the line 10 is inserted like a separator between sets of three adjacent products, thus gathering the products P together as a result of the entrainment towards the wrapping machine, so that separate groups of products to be packaged are formed downstream of the point at which the flow of products P converge with the line 10 and are safely deposited on the base cards 14.

It should be stated, however, that, on the one hand, the use of the solution according to the invention is not restricted to the formation of groups of products but exhibits some of its best qualities in connection with the processing of articles taken individually. On the other hand, it should be noted that the presence of the cards 14 is not essential, particularly where individual articles are concerned.

The present invention thus specifically addresses the problem of causing the flow of articles P from the belt 20 to converge with the chain line 10 in a completely satisfactory manner. This is done whilst taking account of the fact that the initial direction of advance of the products P is inclined at a generally acute angle $\alpha$ to the final direction defined by the entrainment line 10, this term meaning an angle of up to approximately 30°.

Figure 2:
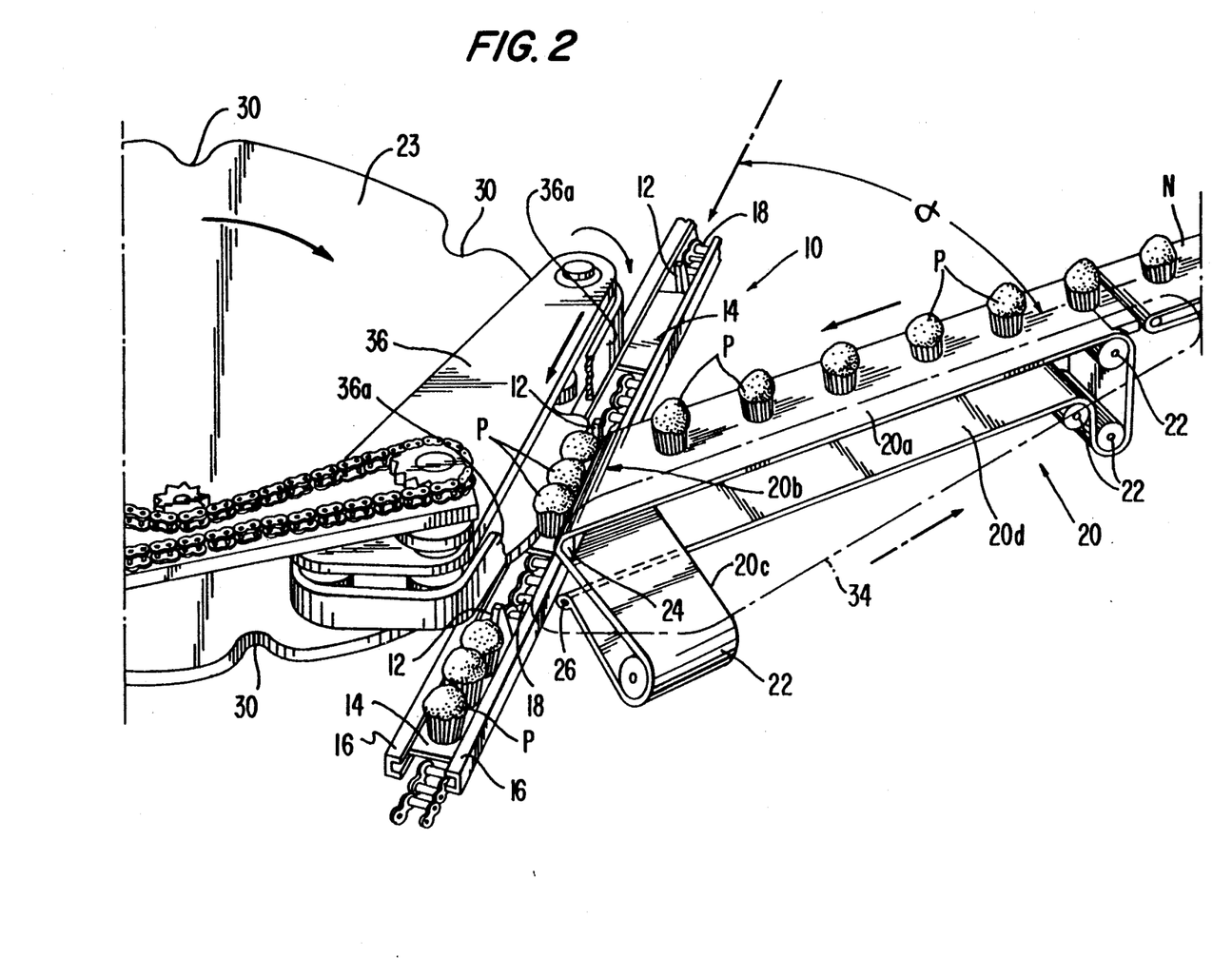
FIG. 2 is a further perspective view of the apparatus of FIG. 1, viewed from an observation point corresponding approximately to the arrow II of FIG. 1.
Figure 4:
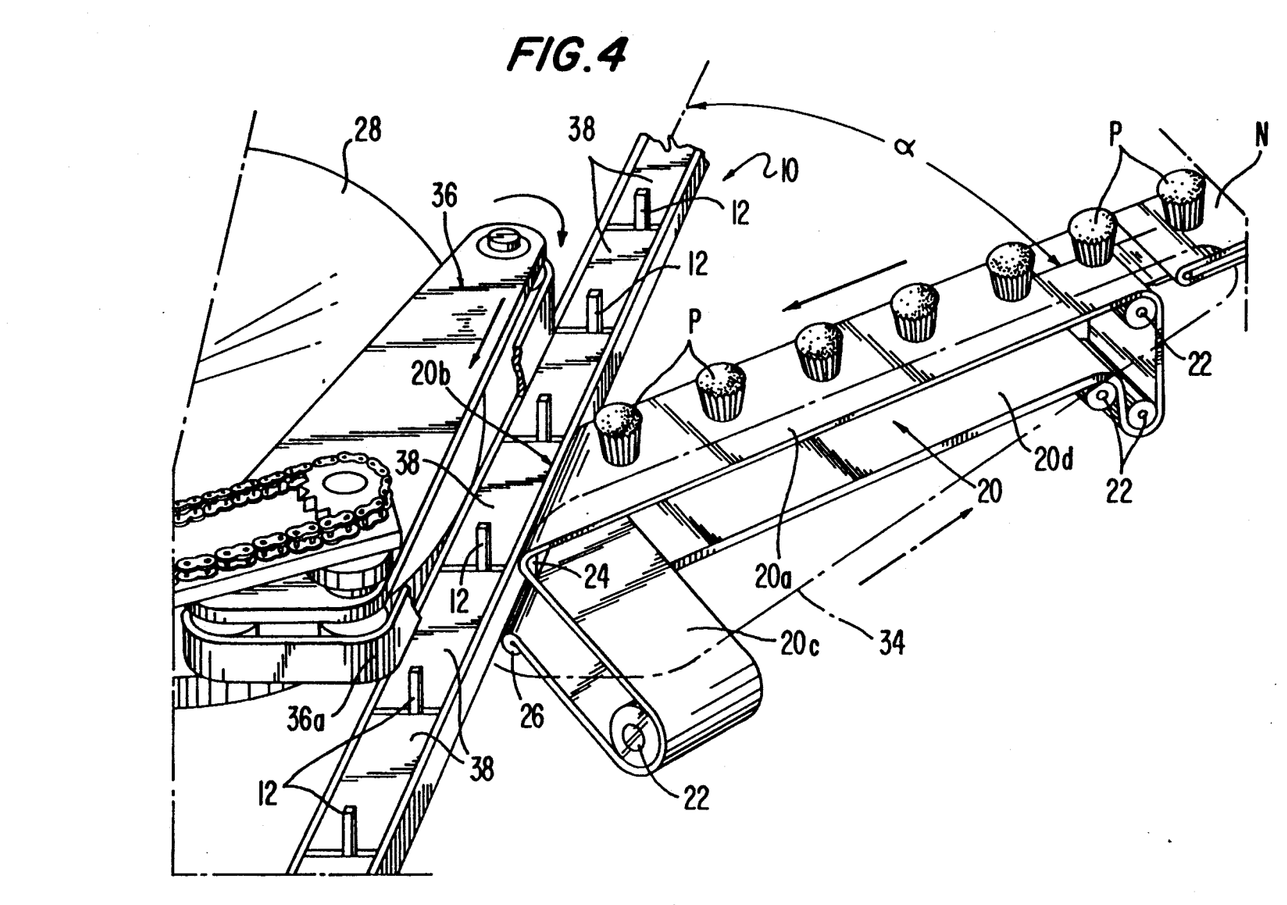
FIG. 4 is a further perspective view which corresponds substantially to FIG. 2 and shows in greater detail one of the elements shown in FIG. 2, and includes, a possible variant of the invention.

For this purpose, the belt or mat 20 is made of flexible material (for example, a core of fabric covered with plastics material suitable for the processing of food products) and passes around a plurality of guide rollers, generally indicated 22 in FIGS. 1, 2 and 4, in a generally endless configuration. At least one of the rollers is driven so as to impart to the upper pass 20a of the belt 20, that is, to the portion of the belt on which the articles P (which generally come from a further belt N situated upstream and visible only in FIGS. 1 and 2) advance, the necessary movement towards the chain line 10.

In particular, in the region in which it meets the line 10, the downstream end 20b (in the direction of advance) of the upper pass 20a of the belt 20 passes downwardly around a return element constituted by a roller or, according to the currently preferred embodiment, a so-called feather-edge 24. This enables the belt to turn downwardly with an extremely small radius of curvature (for example, of a few millimeters).

An important characteristic of the invention is that the feather-edge 24 and consequently the downward turn in the upper pass of the belt 20 in the region in which it meets the line 10 (in practice the downstream or output end of the active pass 20a of the belt 20) is oriented generally obliquely to the direction of advance of the products P and, more precisely, in the direction identified by the line of advance 20.

In deliberately simplified terms, the belt 20 actually "disappears", so to speak, along the line of advance of the line 10.

The products P which are supplied on the centreline of the upper pass 20a are therefore relinquished by the belt 20 precisely in the region where it meets the line 10, so that the direction of flow of the products is diverted.

FIGS. 2 and 4 show in greater detail the path of the belt 20. In these drawings, the upper portion or pass on which the products P advance is indicated 20a and the oblique turn which is formed by the belt around the feather-edge 24 and which defines the output end of the conveyor pass 20a is indicated 20b. A first, lower pass, indicated 20c, however, is constituted by a respective portion of the belt 20 which moves away from the line 10, also obliquely and in practice at an angle of divergence which is symmetrical to the angle of convergence $\alpha$. The lower pass 20c passes downwardly around a first guide roller 22 and then moves towards a second guide element (shown here in the form of a guide 26) which achieves a diversion of the path of movement of the belt complementary to that achieved by the feather-edge 24 in correspondence with the entrainment pass of the line 10. As it passes around the lower guide 26 the belt forms a lower pass 20d which extends substantially along the same line as the upper conveyor pass 20a, to which it is connected by passing over a set of several guide rollers 22, one of which usually acts as a drive roller for the belt 20, which is hence a driven belt, whilst the axis of rotation of one of the other rollers can be moved selectively in order to tension the belt. This is all according to widely known criteria which do not need to be described in specific detail herein.

The discharge of the products P by the upper pass 20a of the belt 20 would not by itself be sufficient to divert the direction of the flow of products P in a complete and reliable manner.

Figure 3:
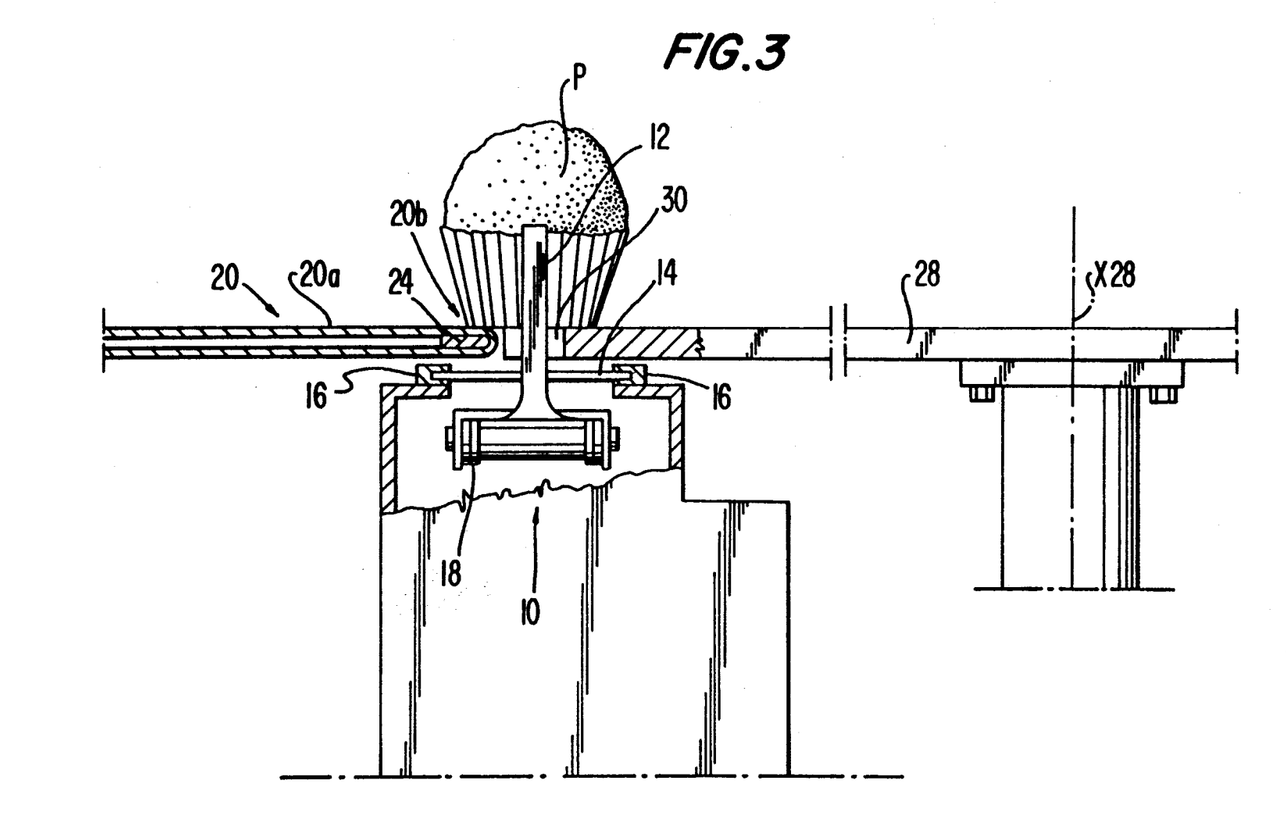
FIG. 3 is a schematic section taken on the line III—III of FIG. 1.

In order to achieve this result in a wholly reliable manner, it is necessary to use an element for cooperating with the belt 20, the element being disposed on the opposite side of the line 10 and, in the embodiment to which FIGS. 1 to 3 relate specifically, being constituted by a horizontal disc 28. The disc 28 is rotated about its axis $X_{28}$ (clockwise with reference to FIGS. 1 and 2) at an angular velocity which is regulated (in known manner) by means of its drive unit 28a so that, taking account of the diameter of the disc 28 (for example, of the order of 40-50 cm) its peripheral velocity, that is, the velocity of its outer edge, is synchronised with and corresponds to the speed of advance of the line 10 (that is, in practice, with the speed of advance of the nibs 12).

The fact that the disc 28 is thin means that its periphery (which has equally spaced notches 30) can be coplanar and almost in contact i.e. substantially tangent with the upper pass 20a of the belt 20 which turns downwardly over the feather-edge 24 (see in particular the sectional view of FIG. 3), at a distance which, in real terms, is, for example, of the order of one millimeter and thus such as to ensure that the disc 28 cannot under any circumstances touch the belt 20 so as to damage it. At the same time, the distance is such that, in practice, it eliminates the gap or slit which the products P have to cross to move from the belt 20 to the entrainment line 10.

The presence of the perimetral notches 30 means that, in the region in question (again see FIG. 3), the nibs 12 can penetrate the periphery of the disc 28 so as to project upwardly from its surface (through the notches 30) as if they were associated with the disc 28 itself. Naturally, this effect is ensured by the synchronisation mentioned above between the speed of advance of the line 10 which carries the nibs 12 and the speed of rotation of the disc 28.

The particular function of the disc 28 is essentially to receive the products P in order at least partially (that is, in the upstream portion in the direction of their advance on the input line defined by the belt 20) to take over, so to speak, the products P which are to be relinquished by the belt 20 which turns downwardly around the feather-edge 24, and also for their general advance determined by the line 10.

At the same time, with the arrangement illustrated, the upper pass 20a of the belt 20 (that is, the surface from which the products P are supplied) is substantially coplanar with the (partial) receiving plane defined by the disc 28. This is all achieved, in combination with a reduction of the gap which the products have to cross to a minimum value (for example, one millimeter), so that there is no risk of the falling-over or rolling of products P which have fairly high centres of gravity in comparison with their bearing surfaces.

In practice, the direction of flow of the products P is diverted from the initial condition in which they advance on the upper pass 20a of the belt 20, firstly by the partial discharge of the products from the belt 20 which turns downwardly around the feather-edge 24 and their consequent partial transfer onto the surface of the disc 28 and, subsequently, by an advancing step in which the belt 20, on the one hand, and the disc 28, on the other hand, accompany the products P which are already oriented in the direction of advance of the line 10 so as to achieve a situation in which the products P, which are finally oriented along the line 10, are firmly taken over thereby both as a result of their crossing the end edge of the belt (that is, in practice, the downstream vertex of the turn line 20b defined by the feather-edge 24, in the direction of advance of the line 10) and as a result of the movement of the periphery of the disc 28 away from the products P as they gradually move away from the position where the belt 20 and the line 10 meet, with the approximately simultaneous or slightly subsequent formation of the groups of products (if required) and their gradual entrainment towards the downstream station, usually between two fixed side retaining walls which are indicated 32 in FIG. 1 only.

The products are generally only finally entrained positively by the nibs 12 of the line 10 at this last stage since this entrainment is not necessary for diverting the flow.

This is especially important when particularly delicate, fragile or soft products P are to be handled. In this case, the synchronisation ("timing") of the supply belt 20 can be regulated in relation to the advance of the nibs 12 so that the products P which are transferred to the line 10 with the use of the disc 28 are in any case slightly in advance of the positions in which the nibs 12 advance throughout the region in which the direction of the flow is diverted.

In practice, the flow is diverted, in principle, by actions exerted exclusively on the supporting bases of the products, without the exertion of transverse restraints or forces (in practice on the sides of the products), except to a very marginal extent.

In this connection, the presence of two lateral restraint structures with vertical walls, indicated 34 and 36 respectively in FIG. 1 and FIG. 2, may, however, be advantageous but is not essential. For accuracy, and to make the representation of the device according to the invention clearer, FIG. 1 shows only the element 34 in continuous outline, the space occupied by the element 36 being shown in broken outline. In FIG. 2, however, a complementary representation has been adopted, with the element 36 shown in continuous outline and the element 34 in chain outline.

As can be seen in FIG. 1, the element 34, which is on the side of the line 10 towards which the belt 20 converges (at the angle $\alpha$), is constituted by an endless, driven belt which passes around respective rollers with vertical axes so as to form a first entrainment pass 34a (for reasons which will become clear from the following, it would be more correct to speak of accompaniment) which extends vertically above the upper pass 20a of the belt 20 in alignment with the direction of advance thereof. The pass 34a of the belt thus forms a first wall for restraining the products P which are still on the belt 20 and a second pass 34b of the same belt, which is further downstream, (naturally with reference to the general direction of advance of the products P), extends along the homologous side of the line 10 in alignment with the direction of advance thereof, immediately upstream of the respective fixed lateral restraint wall 32.

The two passes 34a and 34b are connected in correspondence with a guide roller with a vertical axis, indicated $X_{34}$ in FIG. 1, which is in the region in which the products P are (also) transferred onto the disc 28.

The lateral restraint element 36 is also constituted by an endless motor-driven belt which passes around rollers with vertical axes and includes an active pass 36a which extends along the side of the line 10 on which the disc 28 is situated (that is, on the opposite side from the belt 20), practically throughout the region in which the flow of products P is diverted. In this connection, it will be noted that the line 10 (which is intended also to entrain the cards 14) extends generally both upstream and downstream of the region of convergence of the belt 20 (the output edge 20b).

The criteria for the formation of restraint elements with movable walls such as those indicated 34 and 36 are well known in the art and certainly do not need to be repeated herein.

It should also be noted that the movable walls defined by the belt portions 34a, 34b and 36a—which move at a speed corresponding to the speed of advance of the products P—are not intended primarily for diverting the direction of the flow of products P but, on the contrary, only for accompanying the movement of the products so as to prevent any risk of their being diverted from their intended path.

According to the invention, the flow of the products P is thus diverted primarily by a "supporting" action on the products P without appreciable lateral forces or constraints.

As has been seen above, the perimetral notches 30 along the outline of the disc 28 are essentially for enabling the disc 28 and the nibs 12 of the entrainment chain 10 to interpenetrate in the region in which the direction of flow of the products P is diverted (see in particular FIG. 3) so as to achieve a minimal gap (for example, of the order of one millimeter) for the products to cross when they are discharged from the upper pass of the belt 20a.

This solution certainly seems preferable for products P which are constituted, for example, by pralines housed in corresponding pleated paper cases, that is, products whose centres of gravity are very high in comparison with their bearing surfaces, so that any discontinuity in the sliding and/or entrainment surface may cause them to fall over.

In the case of different, more stable products, that is, products which can better tolerate a certain discontinuity in the conveyor surface, a disc 28 without notches for the passage of the nibs of the entrainment line 10 may be used, as shown schematically in FIG. 4.

Naturally, in this case, the nibs 14 and the periphery of the disc 28 cannot interpenetrate and the gap left between the output edge 20b of the belt 20 and the periphery of the disc 28 is therefore wide enough for the passage of the nibs 14. For example, the gap could be of the order of several millimeters. As stated, this solution may be tolerable for fairly long and stable products (for example, bars of chocolate or the like) which can easily bridge the slit without risk of sticking.

FIG. 4 also shows yet another possible variant of the invention, in which the chain entrainment line 10 is constituted by a chain of the so-called "plate-top" type, which is constituted by a plurality of articulated links 38 the flat upper faces of which are of a certain width (for example, several millimeters) so as themselves to form a surface for supporting and entraining the products P.

The entrainment line 10 is thus arranged so that the upper surfaces of the links of the "plate-top" chain are substantially coplanar with the conveyor surface (the pass 20a) of the belt 20.

In this case, the chain 10 itself acts as the element for receiving the products P in the sense that, during the transfer and thus the diversion of the direction of flow, the bases of the products P no longer bear partially on the output end of the belt 20 and partially on the surface of the disc 28 (as in the embodiment of FIGS. 1 to 3) but rather on the surface of the belt 20, on the surface of the "plate-top" chain 38, and also on the peripheral surface of the disc 28.

If the nature of the product transported permits, the disc 28 may thus even be eliminated and the products transferred by moving from a condition in which they bear wholly on the belt 20 to an intermediate condition in which they bear partially on the output edge of the belt 20 and partially on the plates of the plate-top chain 38 (the diversion of the direction of flow) and, finally, to a final output condition in which they are transported solely by the plate-top chain 38.

At a conceptual level, it can readily be seen that, from a certain point of view, this latter embodiment may be regarded as the use of a disc of infinite radius (the rectilinear element constituted by the upper surface of the plate-top chain) to achieve the restraint.

At least in principle, it is possible to envisage the use of further variants, naturally all included in the scope of the present invention, for example, the use of a further flexible belt as a cooperating or receiving element on the side of the output line 10 opposite that towards which the flow of products P carried on the belt 20 converges, the further belt having, at least locally, a configuration specularly symmetrical to that of the input belt 20. It should be noted, however, that if a flexible conveyor belt is used as a receiving element it is necessary to take account of the fact that the belt will wear gradually in use and will thus require periodic replacement which is not the case, on the other hand, with the use of solid receiving elements (for example, the disc 28 and/or possibly a plate-top chain, which are usually made of metal). These elements do not need to be replaced as a result of wear (except at very long intervals of use); it is necessary, however, to replace the chain of the line 10 (and the disc 28 if it has perimetral notches 30) if the spacing between successive groups of articles output on the line 10 is to be changed, since the spacing is defined by the distance between successive nibs 12.

For example, if one wishes to change from the situation of use to which FIGS. 1 and 2 relate (the formation of groups of three products P) to a solution which provides for the formation of groups of five products P or the formation of groups including only one product (products P to be wrapped individually), it will be necessary to replace the chain by a chain in which the spacing of the nibs 12 corresponds to the desired spacing of the products. If a disc 28 with perimetral notches 30 at spacings corresponding to the distances between the nibs 12 of the chain is to be used, the disc will have to be replaced by another disc with different spacings between the notches 30.

Naturally, the principle of the invention remaining the same, the details of construction and forms of embodiment may be varied widely with respect to those described and illustrated, without thereby departing from the scope of the present invention.

What is claimed is:

1. A device for diverting a flow of products from an initial direction of advance to a final direction of advance which is at a generally acute angle to the initial direction of advance, comprising:
    a first, flexible conveyor which bears and supports the products advancing in the initial direction, said conveyor having a region in it turns downwardly forming an output edge which extends in the final direction, for discharging the products;
    a receiving element, arranged facing and in close proximity to the output edge of the first conveyor, which receiving element receives and at least partially supports the products discharged at the output edge of the first conveyor, the receiving element being able to move substantially in alignment with the final direction of advance at least in correspondence with the output edge of the first conveyor; and
    a second conveyor operating in the final direction of advance to receive the products from the first conveyor and the receiving element.

2. A device according to claim 1, wherein the first conveyor is constituted substantially by an endless, flexible, driven belt.

3. A device according to claim 1, wherein the output edge is defined by a formation around which the first conveyor passes.

4. A device according to claim 3, wherein the formation around which the first conveyor passes is constituted by a feather-edge.

5. A device according to claim 2, wherein the flexible, driven belt has:
- an upper conveyor pass which can support and transport the products towards the receiving element, and
- at least one return pass which extends generally beneath the upper conveyor pass.

6. A device according to claim 5, wherein the flexible, driven belt includes a first lower pass which extends beneath the conveyor upper pass from a turning region of said belt, generally away from the receiving element.

7. A device according to claim 1 wherein the second conveyor extends both upstream and downstream of the output edge of the first conveyor means in a general direction of advance of the products.

8. A device for diverting a flow of products from an initial direction of advance to a final direction of advance which is at a generally acute angle to the initial direction of advance, comprising:
- a first, flexible conveyor which bears and supports the products advancing in the initial direction, said conveyor having a region in it turns downwardly forming an output edge which extends in the final direction, for discharging the products;
- a receiving element, arranged facing and in close proximity to the output edge of the first conveyor, which receiving element receives and at least partially supports the products discharged from the first conveyor, the receiving element being able to move substantially in alignment with the final direction of advance at least in correspondence with the output edge of the first conveyor; and
- a second conveyor operating in the final direction of advance to receive the products from the first conveyor and the receiving element;
- wherein the receiving element is constituted by a disc a periphery of which rotates in a path converging with and in close proximity to the output edge of the first conveyor.

9. A device according to claim 8, wherein the disc is rotated at an angular velocity such that the periphery of the disc moves at a peripheral velocity substantially corresponding to a speed of advance of the products.

10. A device according to claim 8, wherein the second conveyor includes formations for entraining the products, the formations moving in the final direction along a path in close proximity to the output edge of the first conveyor.

11. A device according to claim 10, wherein the disc has peripheral notches spaced around its periphery at intervals corresponding to distances between the entrainment formations, and movement of the disc is synchronized with movement of the second conveyor so that the entrainment formations which are travelling along a portion of their path of movement which is in close proximity to the output edge of the first conveyor, fit in the peripheral notches of the disc.

12. A device for diverting a flow of products from an initial direction of advance to a final direction of advance which is at a generally acute angle to the initial direction of advance, comprising:
- a first, flexible conveyor which bears and supports the products advancing in the initial direction, said conveyor having a region in it turns downwardly forming an output edge which extends in the final direction, for discharging the products;
- a receiving element, arranged facing and in close proximity to the output edge of the first conveyor, which receiving element receives and at least partially supports the products discharged from the first conveyor, the receiving element being able to move substantially in alignment with the final direction of advance at least in correspondence with the output edge of the first conveyor; and
- a second conveyor operating in the final direction of advance to receive the products from the first conveyor and the receiving element;
- wherein the receiving element comprises a plate-top entrainment chain an upper surface of which is substantially coplanar with the first conveyor, and wherein the plate-top chain also constitutes the second conveyor.

13. A device according to claim 12, wherein the receiving element further comprises a rotary disc substantially coplanar with the first conveyor and with the upper surface of the plate-top chain, the first conveyor and the disc being on opposite sides of the plate-top chain.

14. A device for diverting a flow of products from an initial direction of advance to a final direction of advance which is at a generally acute angle to the initial direction of advance, comprising:
- a first, flexible conveyor which bears and supports the products advancing in the initial direction, said conveyor having a region in it turns downwardly forming an output edge which extends in the final direction, for discharging the products;
- a receiving element, arranged facing and in close proximity to the output edge of the first conveyor, which receiving element receives and at least partially supports the products discharged from the first conveyor, the receiving element being able to move substantially in alignment with the final direction of advance at least in correspondence with the output edge of the first conveyor; and
- a second conveyor operating in the final direction of advance to receive the products from the first conveyor and the receiving element;
- wherein the second conveyor is adapted to advance flat formations for constituting support elements for the products towards the output edge.

15. A device for diverting a flow of products from an initial direction of advance to a final direction of advance which is at a generally acute angle to the initial direction of advance, comprising:
- a first, flexible conveyor which bears and supports the products advancing in the initial direction, said conveyor having a region in it turns downwardly forming an output edge which extends in the final direction, for discharging the products;
- a receiving element, arranged facing and in close proximity to the output edge of the first conveyor, which receiving element receives and at least partially supports the products discharged from the first conveyor, the receiving element being able to move substantially in alignment with the final direction of advance at least in correspondence with the output edge of the first conveyor;
- a second conveyor operating in the final direction of advance to receive the products from the first conveyor and the receiving element; and
- lateral restraint elements which are generally movable at a speed substantially corresponding to a speed of advance of the products, on opposite sides of the path of advance of the products, both upstream and downstream of the output edge of the first conveyor, said lateral restraint elements having at least one first pass extending in the initial direction and at least one second pass extending in the final direction, the at least one first pass and the at least one second pass being connected in correspondence with the output edge of the first conveyor.

16. A device according to claim 15, wherein said lateral restraint elements are arranged on both sides of the path of advance of the products.

* * * * *